(12) United States Patent
Dokko

(10) Patent No.: US 7,089,016 B2
(45) Date of Patent: Aug. 8, 2006

(54) CHANNEL ALLOCATION METHOD FOR RADIO DATA CALLS HAVING DIFFERENT BANDWIDTHS

(75) Inventor: Sehjoon Dokko, Seoul (KR)

(73) Assignee: LG Electronics Inc., Seoul (KR)

( * ) Notice: Subject to any disclaimer, the term of this patent is extended or adjusted under 35 U.S.C. 154(b) by 872 days.

(21) Appl. No.: 09/738,309

(22) Filed: Dec. 18, 2000

(65) Prior Publication Data

US 2001/0004599 A1    Jun. 21, 2001

(30) Foreign Application Priority Data

Dec. 16, 1999  (KR) ............................... 1999/58310

(51) Int. Cl.
*H04K 3/00* (2006.01)

(52) U.S. Cl. ............................. 455/452.1; 455/452.2; 455/560; 370/230.1; 370/329; 370/335; 370/349

(58) Field of Classification Search ............. 455/452.1, 455/560, 452.2, 450, 453; 370/335, 337, 370/342, 347, 468, 437, 329, 438, 230.1
See application file for complete search history.

(56) References Cited

U.S. PATENT DOCUMENTS

| | | | | |
|---|---|---|---|---|
| 5,960,039 A | * | 9/1999 | Martin et al. ................ | 375/267 |
| 5,978,387 A | | 11/1999 | Sherman ...................... | 370/468 |
| 6,081,536 A | * | 6/2000 | Gorsuch et al. ............. | 370/468 |
| 6,097,733 A | * | 8/2000 | Basu et al. .................. | 370/468 |
| 6,317,584 B1 | * | 11/2001 | Abu-Amara et al. ........ | 455/12.1 |
| 6,360,076 B1 | * | 3/2002 | Segura et al. ............. | 455/67.11 |
| 6,373,827 B1 | * | 4/2002 | Tayebi et al. ............... | 370/310 |
| 6,480,506 B1 | * | 11/2002 | Gubbi ......................... | 370/468 |
| 6,483,820 B1 | * | 11/2002 | Davidson et al. ........... | 370/329 |
| 6,590,865 B1 | * | 7/2003 | Ibaraki et al. .............. | 370/230 |
| 6,611,503 B1 | * | 8/2003 | Fitzgerald et al. .......... | 370/260 |
| 6,690,938 B1 | * | 2/2004 | Chin .......................... | 455/450 |
| 6,738,623 B1 | * | 5/2004 | Oh et al. .................... | 455/450 |
| 6,754,189 B1 | * | 6/2004 | Cloutier et al. ............. | 370/329 |
| 2002/0114301 A1 | * | 8/2002 | Yee et al. ................... | 370/338 |
| 2002/0186710 A1 | * | 12/2002 | Alvesalo et al. ............ | 370/468 |

* cited by examiner

*Primary Examiner*—Charles N. Appiah
*Assistant Examiner*—Khawar Iqbal
(74) *Attorney, Agent, or Firm*—Fleshner & Kim, LLP

(57) ABSTRACT

A channel allocation method for radio data calls having different bandwidths to each other in a radio data call processing structure between a mobile switching system and an IWF is disclosed. The method includes receiving a data call connection request; allocating an available time slot and an E1 link; judging a requested bandwidth on the basis of a service option of a received data call; defining a weight value of each data call by using a rate of the requested bandwidth; and dynamically allocating an $H_0$ channel on an E1 link on the basis of the number of data calls occupied at each $H_0$ channel and the weight value of each data call.

16 Claims, 4 Drawing Sheets

CHANNEL ALLOCATION METHOD FOR RADIO DATA CALLS HAVING DIFFERENT BANDWIDTHS

BACKGROUND OF THE INVENTION

1. Field of the Invention

The present invention relates to a mobile communication system, and more particularly, to a channel allocation method for radio data calls having different bandwidths to each other.

2. Background of the Related Art

In a mobile communication network, a call connection of a mobile subscriber is typically performed by a call processing unit of a mobile switching system. The call processing unit discriminates and processes a voice call and a data call according to a service option of a call. The traffic of the voice call is transmitted in a 64 Kbps PCM (Pulse Code Modulation) method, while the traffic of the data call is converted to a frame relay mode, and processed by being interworked with an Interworking Function (IWF) of a data network.

FIG. 1 illustrates a call processing structure between the mobile switching system 10 and the IWF 20. When a call set-up request is inputted from a mobile subscriber, a call processing unit 11 determines whether it is a voice call or a data call according to a service option of that call. If the call is determined to be a voice call, the call processing unit 11 transmits the voice call to its destination through a relay line processing unit 14 to a PSTN (Public Switched Telephone Network) network. If, however, the call is a data call, the call processing unit 11 outputs the service option of the corresponding call and its related parameters to a frame relay converting unit 12, and requests that the frame relay converting unit 12 connect a traffic path to the IWF 20.

Upon receipt of the request for a traffic path connection from the call processing unit 11, the frame relay converting unit 12 converts the traffic of the 64 Kbps data call, that is, the traffic transmitted in the PCM method, to a frame relay mode. The frame relay connecting unit 12 then transmits the traffic to the IWF 20. The traffic of each data call thusly converted to the frame relay is sequentially multiplexed to an $H_0$ channel of an E1 link and transmitted to the IWF 20.

The IWF 20 then determines whether the data call outputted from the frame relay converting unit 12 is transmitted in a circuit switching system or in a packet switching system. If the data call is to be transmitted in the circuit switching system, it is transmitted in an ISDN PRI (Primary Rate Interface) method through the PSTN path processing unit 13 of the mobile switching system 10 to the PSTN network. If, however, the data call is to be transmitted in the packet switching system, it is directly transmitted to a PSDN (Public Switched Data Network).

FIG. 2 is a diagram showing a construction of a related art frame relay converting unit of FIG. 1. The frame relay converting unit 12 includes a plurality of selves (self1~selfn). 15 control boards, each having 8 time slots, and two control boards, each having 5 $H_0$ channels, are mounted per single self. That is, each self includes total 120 time slots (64 Kbps) and two E1 links each having five $H_0$ channels (384 Kbps).

Referring to FIG. 3, the operation of the related art method of channel allocation will be described. First, a data call connection request is received from the call processing unit 11 (Step S31). The frame relay converting unit 12 then allocates an available time slot (Step S32). At this time, since each self (self0~selfn) includes total 120 time slots (64 Kbps), 120 data calls can be accommodated altogether.

When a time slot is allocated, the frame relay converting unit 12 allocates the $H_0$ channel on the E1 link corresponding to the time slot, and assigns DLC (Data Link Connection Identifier) values sequentially or in a round-robin method, thereby allocating a plurality of data calls to the $H_0$ channel (Step S33).

Accordingly, when only an IS (Interim Standard)-95A based data call is supported, the data call has a maximum single bandwidth of 13 Kbps due to the bandwidth limitation of a wireless interval. Thus, in order to guarantee a quality of data service, a maximum of 30 data calls can be allocated to a single $H_0$ channel. Each data call is discriminated by DLCI values (DLCI0~DLCI119) in the same channel.

As the $H_0$ channel and the DLCI value are assigned on the E1 link, the frame relay converting unit 12 stores channel state information (Step S34), and converts the traffic transmitted from the allocated time slot to a frame relay and transmits it through the E1 channel to the IWF 20 (Steps S35, S36).

FIG. 4 show a sequential channel allocation for data calls having a single bandwidth to each other in accordance with the related art.

The method of sequential channel allocation according to the related art has various problems. For example, as described above, for the purpose of interworking with the IWF, the channel allocation on the E1 link is performed whenever a call is requested. For radio data calls according to IS-95A having a single bandwidth (13 Kbps) as shown in FIG. 4, since the number of occupied DLCs, that is, the number of data calls, signifies an occupied bandwidth, no problem arises with respect to channel allocation.

However, in the related art sequential channel allocation as shown in FIG. 4, when a new data call is requested after a third $H_0$ channel is allocated, even though there is a $H_0$ channel which does not go beyond the service quality guarantee limitation, a fourth $H_0$ channel is allocated. Thus, channel congestion occurs and the call is delayed. This phenomenon becomes more serious where a middle-speed service and an high-speed service, such as the IS-95B and the IS-95C, having different bandwidths (64 Kbps, 128 Kbps) are supported together.

Accordingly, the related art sequential channel allocating method, which considers only the number of data calls without counting the bandwidth, causes a traffic delay due to traffic congestion. This results in a waste of the channel resource and a deterioration of capacity to accommodate subscribers.

The above references are incorporated by reference herein where appropriate for appropriate teachings of additional or alternative details, features and/or technical background.

SUMMARY OF THE INVENTION

It is an object of the present invention to provide a channel allocation method for radio data calls that substantially obviates disadvantages and problems due to limitations of the related art.

It is another object of the present invention to provide a channel allocation method for radio data calls that is capable of variably allocating a channel for data calls having different bandwidth each other.

Another object of the present invention is to provide a channel allocation method for radio data calls that is capable of preventing a traffic delay and effectively utilizing a channel resource by allocating an $H_0$ channel according to a bandwidth required by each data call.

To achieve at least the above objects in whole or in parts, there is provided a channel allocation method for radio data calls between a mobile switching system and an IWF wherein traffic attributions of each data call are discriminated based on a service option value of a mobile subscriber call and data calls having different bandwidth to each other are dynamically allocated to an $H_0$ channel of an E1 link.

To further achieve at least the above objects in whole or in parts, there is also provided a channel allocation method for radio data calls having different bandwidths to each other in a radio data call processing structure between a mobile switching system and an IWF, including the steps of: receiving a data call connection request; allocating an available time slot and an E1 link; judging a requested bandwidth on the basis of a service option of a received data call; defining a weight value of each data call by using the rate of the requested bandwidth; and dynamically allocating an $H_0$ channel on an E1 link on the basis of the number of data calls occupied at each $H_0$ channel and the weight value of each data call.

According to the channel allocation method for radio data calls, the step of allocating the $H_0$ channel preferably includes sub-steps of comparing whether the requested bandwidth is greater than a reference bandwidth; operating the number of the data calls and the weight value of each data call, to compute a bandwidth occupied by a data call currently being in a connected state; subtracting the occupied bandwidth from the maximum allowable bandwidth by $H_0$ channels, to check whether there is any available bandwidth in each $H_0$ channel; and variably allocating an $H_0$ channel according to existence of the available bandwidth.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
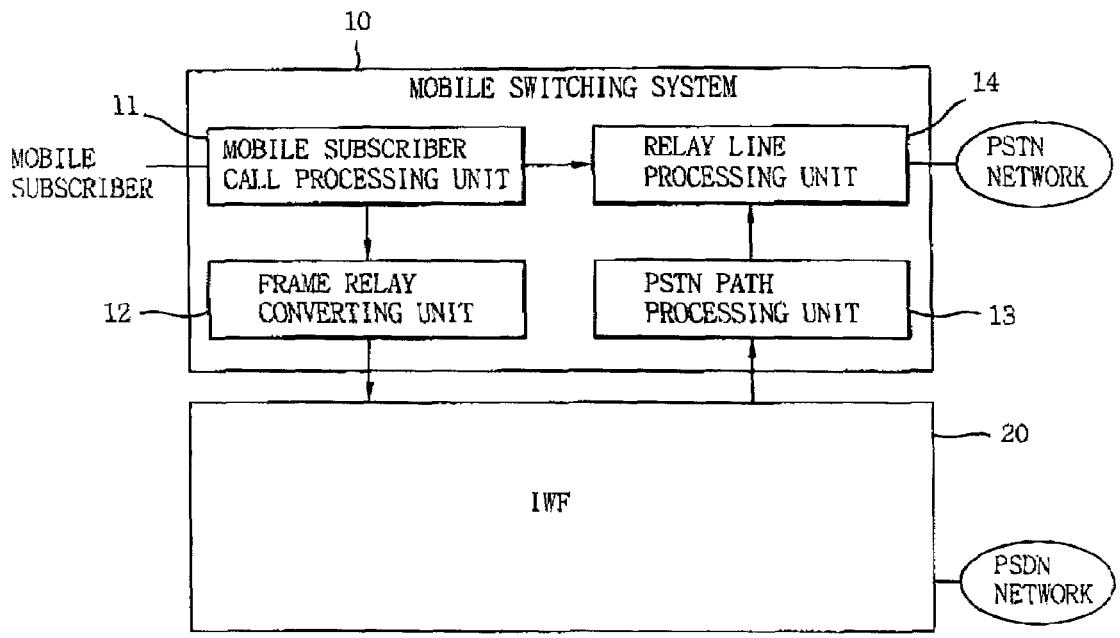
FIG. 1 is a drawing illustrating a related art call processing structure between a mobile switching system and an IWF.
Figure 2:
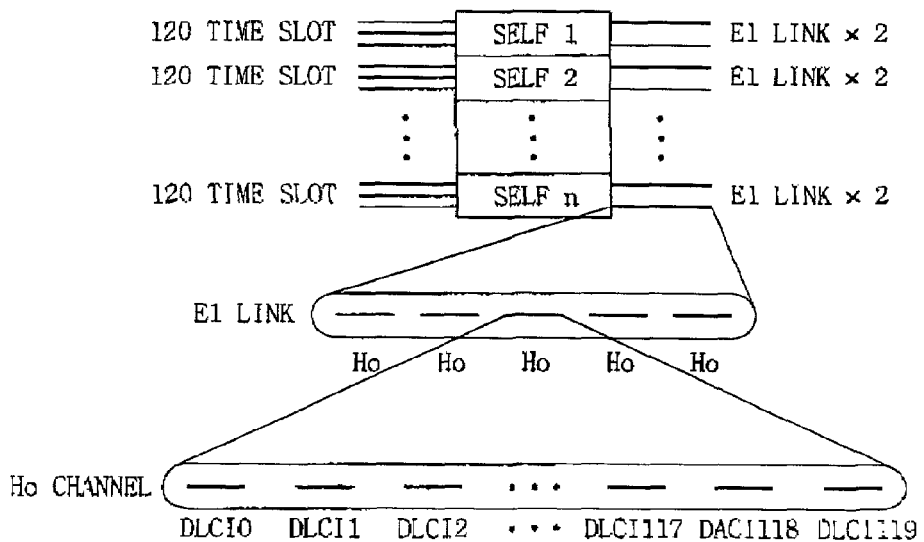
FIG. 2 is a drawing illustrating construction of a frame relay converting unit of FIG. 1.
Figure 3:
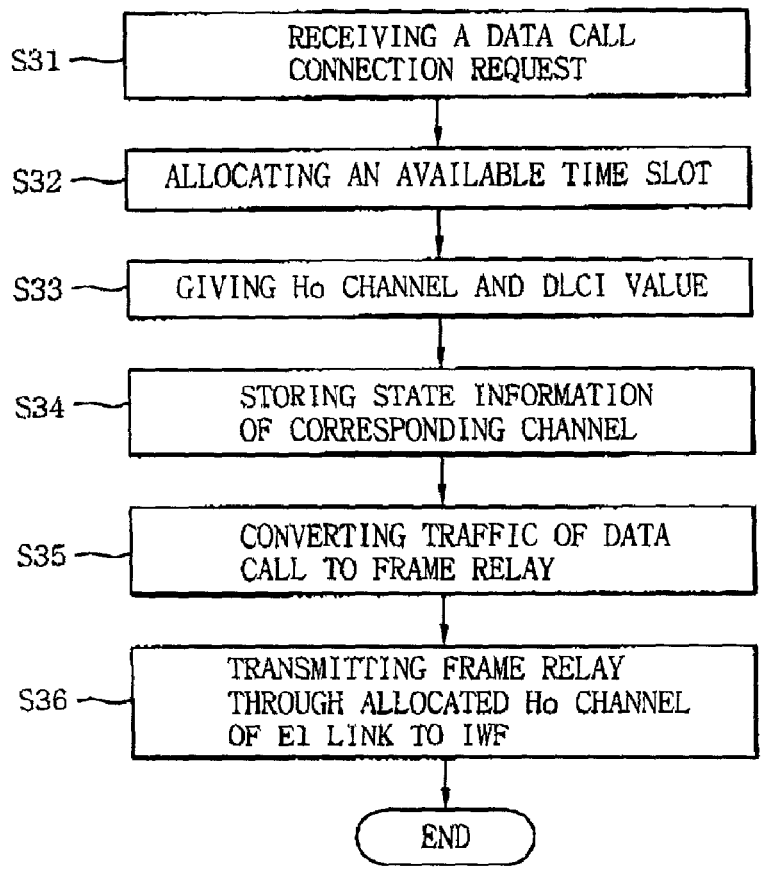
FIG. 3 is a flow chart of a related art channel allocation method for a radio data call having a single bandwidth.

The data call processing structure of the present invention is similar to that of the related art, as shown in FIG. 1. The mobile switching system 10 preferably determines a traffic attribute of a data call, and discriminates between a voice call and a data call according to a service option value of a call. Additionally, however, the data call processing structure supports data calls having different bandwidths than each other.

That is, when the mobile switching system 10 is interworking with the IWF 20, it determines an attribute of each data call, and variably allocates the $H_0$ channel of the E1 link according to a bandwidth required by each data call.

The channel allocation method for radio data calls in the call processing structure of the present invention will now be described. When a call set-up request is inputted, the call processing unit 11 determines whether the corresponding call is a voice call or a data call according to the service option.

If the call is a voice call, the call processing unit 11 transmits it through the relay line processing unit 14 to the PSTN network. If the call is a data call, however, the call processing unit 11 outputs a service option and its related parameters to the frame relay converting unit 12, to request connection of a traffic path to the IWF 20.

Upon receiving the data call connection request from the call processing unit 11 (Step S41), the frame relay converting unit 12 allocates an available time slot for the requested data call, and determines a required/requested bandwidth based on the service option of the corresponding data call (Steps S42, S43).

At this time, the requested bandwidth is divided into 13 Kbps, 64 Kbps, and 128 Kbps depending on the service option, and weighted values of each requested bandwidth are allocated and managed according to the rate of the bandwidth.

Accordingly, a requested bandwidth of the IS-95A (13 Kbps)-based low speed data call is defined to be 1 unit, a requested bandwidth of the IS-95B (64 Kbps)-based middle speed data call is defined to be 5 units, and a requested bandwidth of the IS-95C (128 Kbps)-based high speed data call is defined to be 10 units.

For purposes of example, a case where the two bandwidths of the IS-95A and the IS95B are supported together is described hereinafter. It should be understood that any configuration could be used.

When a bandwidth of a data call is determined, the frame relay converting unit 12 analyzes the bandwidth and determines whether the requested bandwidth is greater than a reference bandwidth. For purposes of example, the reference bandwidth is 2 units (Step S44). If the requested bandwidth (1 unit) is smaller than the reference bandwidth (2 units), the frame relay converting unit 12 computes a bandwidth occupied by a data call currently in a connected state for each $H_0$ channel (Step S45). In this respect, the bandwidths being used in each channel can be obtained by adding weight values as much as the currently allocated DLCIs.

Upon computing the occupied bandwidth, the frame relay converting unit 12 determines whether there is an $H_0$ channel having an available bandwidth (Step S46). Generally, the $H_0$ channel allows 384Kbps bandwidth, so that a single $H_0$ channel is able to provide a call connection service for at least 30 units without a traffic delay. Thus, the frame relay converting unit 12 subtracts an occupied bandwidth (currently occupied weigh (unit)) from the maximum allowable bandwidth (30 units) by $H_0$ channels, to compute an available bandwidth.

If no $H_0$ channel has an available bandwidth, the frame relay converting unit 12 allocates an $H_0$ channel having the least occupied bandwidth for traffic processing of the corresponding data call. This is done to reduce a traffic delay of the corresponding data call at the maximum.

Meanwhile, if there is an $H_0$ channel having an available bandwidth, the frame relay converting unit 12 allocates an $H_0$ channel having the least available bandwidth. Thus, as the $H_0$ channel having the least available bandwidth is allocated for traffic of the corresponding data call if a data call, having a requested bandwidth that is larger than the reference bandwidth is requested to be connected later, the traffic of the corresponding data call can be processed more effectively.

For example, if a first $H_0$ channel having an available bandwidth of 2 units and a second $H_0$ channel having an available bandwidth of 5 units are both available, a data call which requests a bandwidth of 1 unit is allocated to the first $H_0$ channel, while a data call which requests a bandwidth of 5 units is allocated to the second channel. In this way, traffic of the next requested data call can be effectively processed.

Meanwhile, in Step S44, if the requested bandwidth (for example, 5 units) is greater than the reference bandwidth (2 units), the frame relay converting unit 12 computes the occupied bandwidth in the same manner (Step S52) and subtracts the occupied bandwidth from the maximum 30 units, to thereby check whether there is an $H_0$ channel having an available bandwidth (Step S53).

Upon checking, if no $H_0$ channel having an available bandwidth exists, the frame relay converting unit 12 allocates an $H_0$ channel having the least occupied bandwidth for traffic processing. If, on the other hand, an $H_0$ channel having an available bandwidth exists, the frame relay converting unit 12 allocates an $H_0$ channel having the largest available bandwidth.

Figure 4:
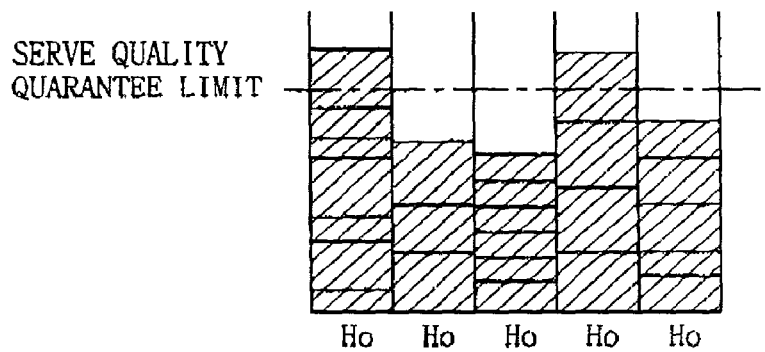
FIG. 4 is a drawing illustrating a related art sequential channel allocation for data calls having a single bandwidth.
Figure 5:
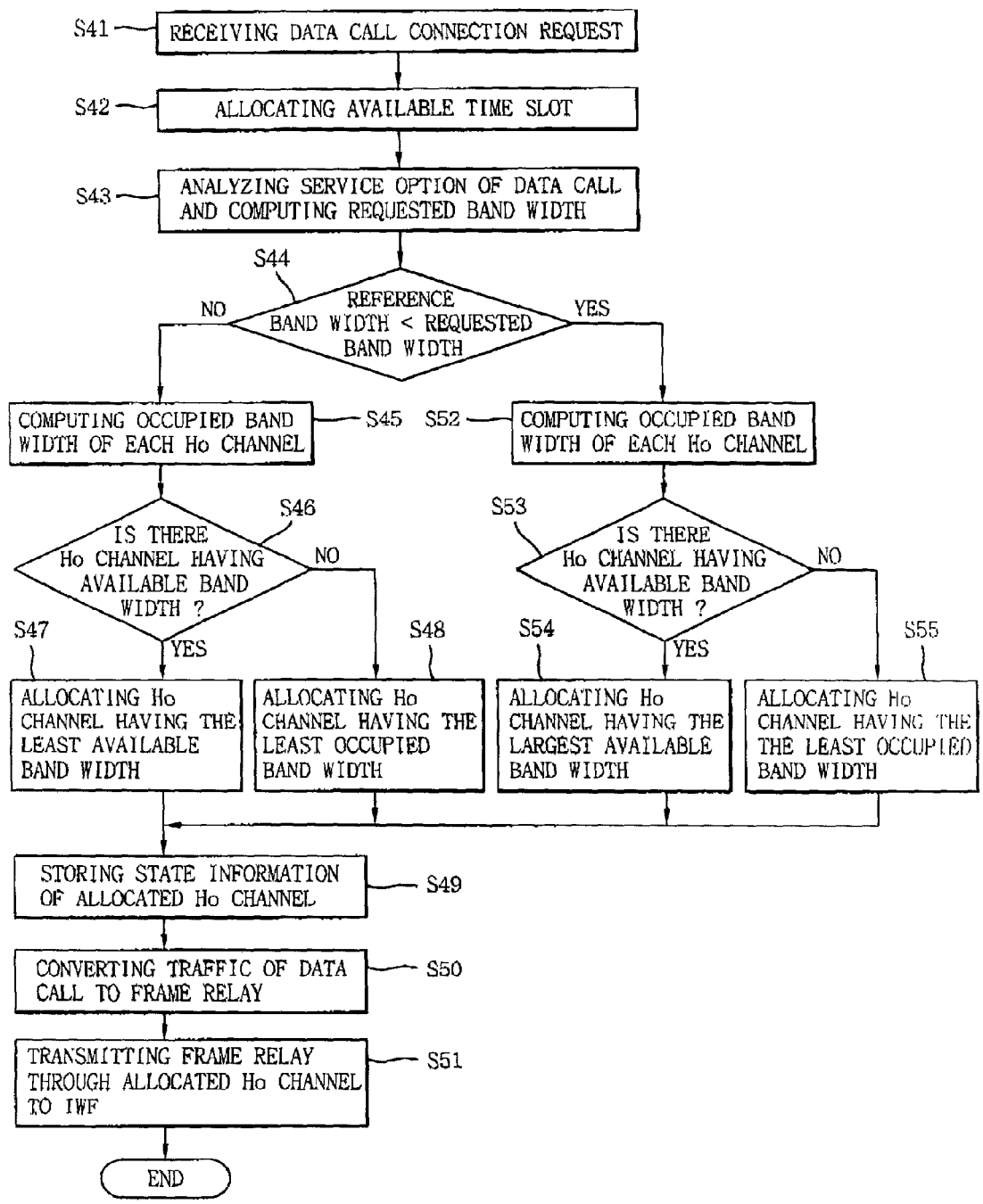
FIG. 5 is a flow chart showing a channel allocation method for radio data calls having different bandwidth to each other, in accordance with a preferred embodiment of the present invention.
Figure 6:
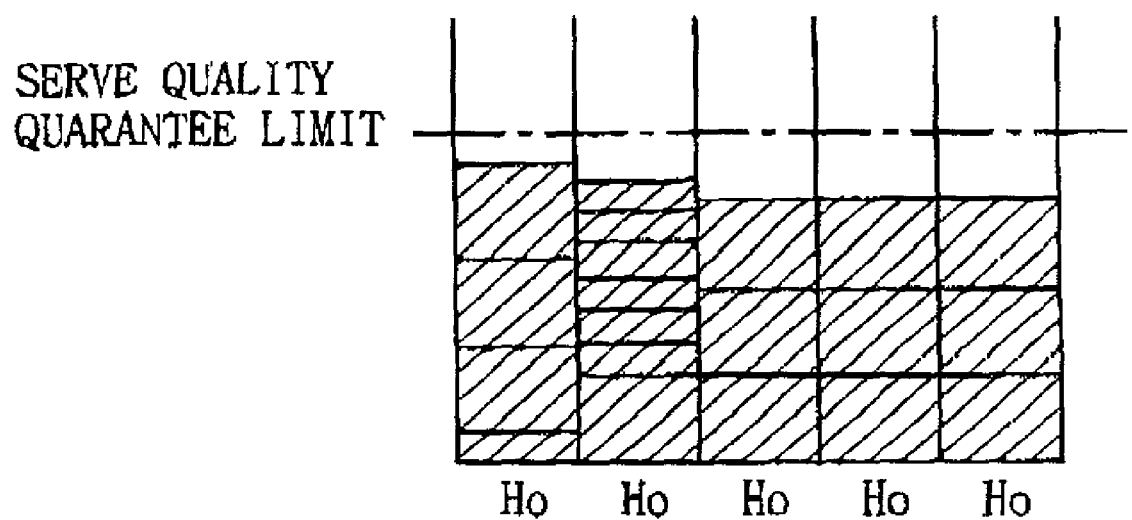
FIG. 6 is a drawing illustrating a dynamic channel allocation for data calls having different bandwidths to each other in accordance with the preferred embodiment of the present invention.

In other words, as shown in FIG. 6, in the preferred embodiment, a data call having a smaller bandwidth is allocated to a first $H_0$ channel, while a data call having a larger bandwidth is allocated to a third $H_0$ channel, so that an even bandwidth distribution can be made, and thus, the uneven channel congestion as shown in FIG. 4 can be prevented.

Next, as the $H_0$ channel is allocated on the E1 link, the frame relay converting unit 12 stores state information of the allocated $H_0$ channel (Step S49). It then converts the traffic of the data call transmitted from the call processing unit 11 to a frame relay, and transmits it through the corresponding $H_0$ channel to the IWF 20 (Steps S50, S51).

It should be understood that the above-described system and method is not limited to the case that the both bandwidths of the IS-95A and IS-95B are supported. Thus, the present invention is also effectively adopted to a case that an IS-95A-based low speed data call, an IS-95B-based middle speed data call, and an IS-95C-based high speed data call can be supported altogether in consideration of occurrence frequency of each data call.

For example, after the reference bandwidth is set as 5 units for the middle speed data call, an $H_0$ channel is allocated in the same manner as described above. If a requested bandwidth is the same as the reference bandwidth, a channel can be allocated in consideration of an occurrence frequency of the high speed data call having 10 units of bandwidth.

In other words, if the occurrence frequency of the high speed data call is high, the channel allocation method when a requested bandwidth is smaller than the reference bandwidth is used. If, however, the occurrence frequency of the high speed data call is low, the channel allocation method when a requested bandwidth is greater than the reference bandwidth.

As described herein, the channel allocation method for radio data calls having different bandwidths to each other of the present invention has many advantages. For example, the $H_0$ channel of the E1 link is variably allocated according to the bandwidth required for a data call. Consequently, a traffic delay due to a channel congestion is prevented and the channel resources can be more effectively utilized.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for allocating channels for radio data calls comprising:
   receiving a data call connection request;
   determining a traffic attribute of the data call;
   determining an occupied bandwidth of each of a plurality of channels of a transmission link occupied by other connected calls; and
   dynamically allocating the data call among the plurality of channels based on the determined traffic attribute and the determined occupied bandwidth, wherein a mobile switching system subtracts an occupied channel bandwidth from a maximum allowable channel bandwidth to determine whether there is a minimum available bandwidth in each channel, and allocates the channel having the least occupied bandwidth when no channel has the minimum available bandwidth and allocates the channel having the least available bandwidth when a channel exists having the minimum available bandwidth.

2. The method of claim 1, wherein a bandwidth of the data call is determined based on the traffic attribute and the bandwidth occupied by the other connected data calls is determined based on a number of other data calls and prescribed weight values of each of the other data calls.

3. The method of claim 2, wherein the weight value is allocated in a unit form according to a rate of the bandwidth.

4. The method of claim 3, wherein a bandwidth of 13Kbps-based low speed data call comprises 1 unit, a bandwidth of 64 Kbps-based middle data call comprises 5 units, and a bandwidth of 128 Kbps-based high speed data comprises 10 units.

5. The method of claim 1, wherein the maximum allowable bandwidth is 30 units.

6. The method of claim 1, wherein the traffic attribute is determined based on a service option.

7. The method of claim 1, wherein the channels are $H_0$ channels and the transmission link is an E1 link.

8. A method for allocating channels for radio data calls comprising:
   receiving a data call connection request;
   determining a traffic attribute of the data call;

determining an occupied bandwidth of each of a plurality of channels of a transmission link occupied by other connected calls; and dynamically allocating the data call among the plurality of channels based on the determined traffic attribute and the determined occupied bandwidth, wherein a mobile switching system allocates a channel having the largest available bandwidth when a requested bandwidth of the data call is greater than a prescribed bandwidth and the channel having an available bandwidth exists and the mobile switching system allocates a channel having the least occupied bandwidth when the requested bandwidth of the data call is greater than the prescribed bandwidth and the channel having the available bandwidth does not exist.

9. The method of claim 8, wherein the mobile switching system allocates a channel having the least occupied bandwidth if the requested bandwidth is smaller than the reference bandwidth and a channel having available bandwidth does not exist.

10. The method of claim 8, wherein the mobile switching system allocates a channel having the least available bandwidth if the requested bandwidth is smaller than the reference bandwidth and a channel having available bandwidth does exist.

11. A method for allocating channels for radio data calls comprising:

receiving a data call connection request;
determining a traffic attribute of the data call;
determining an occupied bandwidth of each of a plurality of channels of a transmission link occupied by other connected calls; and
dynamically allocating the data call among the plurality of channels based on the determined traffic attribute and the determined occupied bandwidth, wherein a mobile switching system allocates a channel having the least available bandwidth when a requested bandwidth of the data call is smaller than a prescribed reference bandwidth and the channel having an available bandwidth exists, and the mobile switching system allocates a channel having the least occupied bandwidth when the requested bandwidth of the data call is smaller than the prescribed reference bandwidth and the channel having the available bandwidth does not exist.

12. The method of claim 11, wherein the mobile switching system allocates a channel having the least occupied bandwidth if the requested bandwidth is greater than the reference bandwidth and a channel having available bandwidth does not exist.

13. The method of claim 11, wherein the mobile switching system allocates a channel having the largest available bandwidth if the requested bandwidth is greater than the reference bandwidth and a channel having available bandwidth does not exist.

14. A channel allocation method for radio data calls, comprising:

receiving a data call connection request;
allocating an available time slot and an E1 link;
determining a requested bandwidth based on a service option of a received data call;
defining a weight value of the data call in accordance with the requested bandwidth;
dynamically allocating an $H_0$ channel on the E1 link based on a number of connected data calls occupying each of a plurality of $H_0$ channels and the weight value of each connected data call, wherein allocating the $H_0$ channel comprises:
determining whether the requested bandwidth is greater than a reference bandwidth;
computing a bandwidth occupied by the connected data calls;
subtracting the occupied bandwidth from a maximum allowable bandwidth for each $H_0$ channel, to determine whether any available bandwidth exists in each $H_0$ channel;
allocating an $H_0$ channel having the least occupied bandwidth if no $H_0$ channel exists;
allocating a $H_0$ channel having the largest available bandwidth if the requested bandwidth is greater than the reference bandwidth and a $H_0$ channel having available bandwidth exists; and
allocating a $H_0$ channel having the least available bandwidth if the requested bandwidth is smaller than the reference bandwidth and a $H_0$ channel having available bandwidth exists.

15. The method of claim 14, wherein allocating an $H_0$ channel having the least occupied bandwidth if no $H_0$ channel exists includes:

allocating a $H_0$ channel having the least occupied bandwidth if the requested bandwidth is greater than the reference bandwidth and an $H_0$ channel having available bandwidth does not exist.

16. The method of claim 14, wherein allocating an $H_0$ channel having the least occupied bandwidth if no $H_0$ channel exists includes:

allocating an $H_0$ channel having the least occupied bandwidth if the requested bandwidth is smaller than the reference bandwidth and an $H_0$ channel having available bandwidth does not exist.

* * * * *